United States Patent

Olson et al.

(10) Patent No.: US 9,637,873 B2
(45) Date of Patent: May 2, 2017

(54) SENSING SYSTEM FOR ROAD CONSTRUCTION EQUIPMENT

(75) Inventors: Michael R. Olson, Brooklyn Park, MN (US); Jack Zeng, Eden Prairie, MN (US)

(73) Assignee: SAUER-DANFOSS INC., Ames, IA (US)

( * ) Notice: Subject to any disclaimer, the term of this patent is extended or adjusted under 35 U.S.C. 154(b) by 1034 days.

(21) Appl. No.: 13/326,086

(22) Filed: Dec. 14, 2011

(65) Prior Publication Data

US 2013/0158812 A1   Jun. 20, 2013

(51) Int. Cl.
 *E01C 19/00* (2006.01)
 *E01C 19/48* (2006.01)
 *G01S 5/00* (2006.01)

(52) U.S. Cl.
 CPC ............ *E01C 19/004* (2013.01); *E01C 19/48* (2013.01); *G01S 5/0009* (2013.01)

(58) Field of Classification Search
 CPC ....... E01C 19/004; E01C 19/48; G01S 5/0009
 USPC .......................................................... 701/50
 See application file for complete search history.

(56) References Cited

U.S. PATENT DOCUMENTS

| 7,085,637 | B2* | 8/2006 | Breed et al. ................ 701/38 |
| 2001/0027360 | A1* | 10/2001 | Nakano et al. ............... 701/23 |
| 2002/0198632 | A1* | 12/2002 | Breed et al. ................. 701/1 |
| 2006/0201432 | A1* | 9/2006 | Pratt ..................... 119/51.02 |
| 2008/0191875 | A1 | 8/2008 | Park |
| 2008/0253834 | A1* | 10/2008 | Colvard .................. 404/84.05 |
| 2009/0250424 | A1* | 10/2009 | Moller ..................... 212/276 |

FOREIGN PATENT DOCUMENTS

| EP | 2298228 | 3/2011 |
| WO | 2008133586 | 11/2008 |
| WO | 2008137806 | 11/2008 |
| WO | 2009105724 | 8/2009 |

* cited by examiner

*Primary Examiner* — Behrang Badii
*Assistant Examiner* — Daniel L Greene
(74) *Attorney, Agent, or Firm* — Zarley Law Firm, P.L.C.

(57) ABSTRACT

A sensing system for road construction equipment that includes a mounting bracket secured to a road construction vehicle that has an RFID tag. A wireless sensor is provided with an RFID reader so that when the wireless sensor is secured in the mounting bracket the RFID scanner is adjacent the RFID tag and scans and reads the RFID tag sending location information of the wireless sensor to a master controller.

6 Claims, 2 Drawing Sheets

SENSING SYSTEM FOR ROAD CONSTRUCTION EQUIPMENT

BACKGROUND OF THE INVENTION

This invention relates to a sensing system. More specifically, this invention relates to a sensing system for road construction equipment.

In the road construction arts sensor systems are utilized in association with road construction equipment such as road construction vehicles like pavers where a sensor associated with the vehicle has cables that go to remotely located sensors that are placed spaced from the vehicle sensor. The remotely located sensors are often positioned to provide readings to the vehicle sensor in order to steer the vehicle in a straight line or control the elevation of part of the equipment of the vehicle for proper use. Problems exists with these systems in that the cables oftentimes will get run over, damaged, or the like during the use of the systems creating costly repairs and delays to occur.

As a solution to this problem Applicant has introduced the use of wireless systems associated with such vehicles as provided in U.S. patent application Ser. No. 13/298,105 that is incorporated herein. As a result of the use of the wireless sensors new problems have occurred with how to identify sensors by a controller within the machine. Currently, four to six sensors are placed away from the main body of the machine and are removed at the end of the day. There is no need to return the same sensor in the same location because each sensor is identical and its work function is identified through the individual analog input port it is interfaced to if it is an analog sensor or through a CAN ID configuration resistor that is attached externally to the individual sensor if it is a CAN bus sensor. CAN bus (stands for Controller Area Network) is a message-based protocol, designed specifically designed to allow microcontrollers and devices to communicate with each other without a host computer. However, a wireless sensor cannot use these two methods because there is no physical wired connection.

Thus, a need in the art exists to provide a manner in which to identify a wireless sensor system utilized with the road construction equipment. While one could present a wireless sensor transmitter that each has it own unique wireless receiver, such a solution would be expensive and create additional required time by workers to set up such a system. Alternatively, a worker could individually configure each sensor always installing each sensor in the same machine location or use manual configuration switches and/or buttons on the sensor to set up each sensor for every time the sensor is moved, which could potentially happen daily. Again, these are solutions that would be time consuming, rigorous and undesired.

Therefore a principle object of the present invention is to provide a time efficient manner in identifying a wireless sensor associated with road construction equipment.

Yet another object of the present invention is to identify a wireless sensor road construction equipment.

These and other objects, features and advantages will become apparent from specification and claims.

BRIEF SUMMARY OF THE INVENTION

A sensing system for road construction equipment. The system includes a road construction vehicle that has a mounting bracket with a machine readable medium affixed thereon. A wireless sensor is mounted on the mounting bracket and has a reading device such that when the wireless sensor is mounted to the bracket the reading device is able to scan and thus read the machine readable medium to receive location data from the medium.

DETAILED DESCRIPTION OF THE PREFERRED EMBODIMENT

Figure 1:
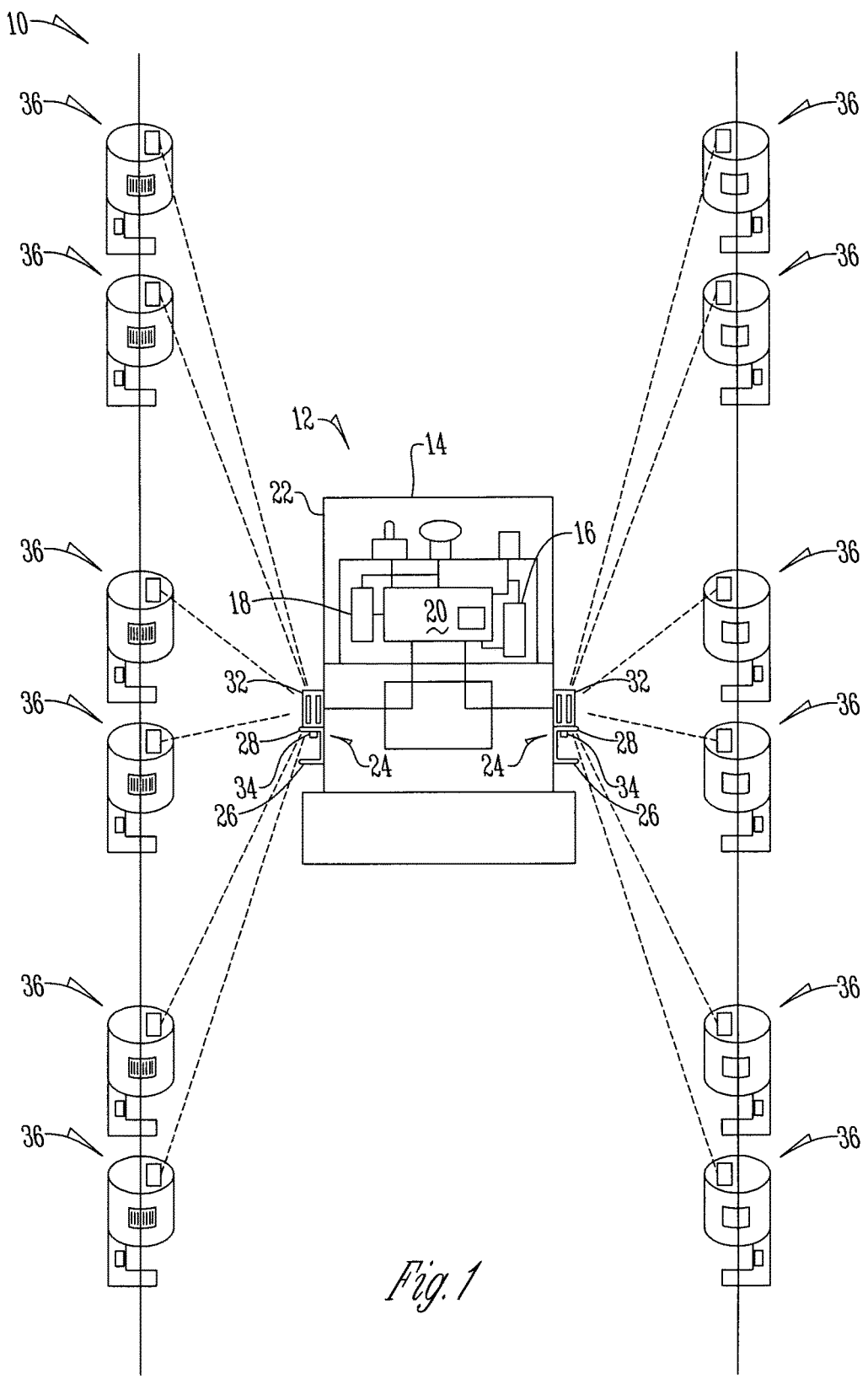
FIG. 1 is a schematic diagram of a sensor system.
Figure 2:
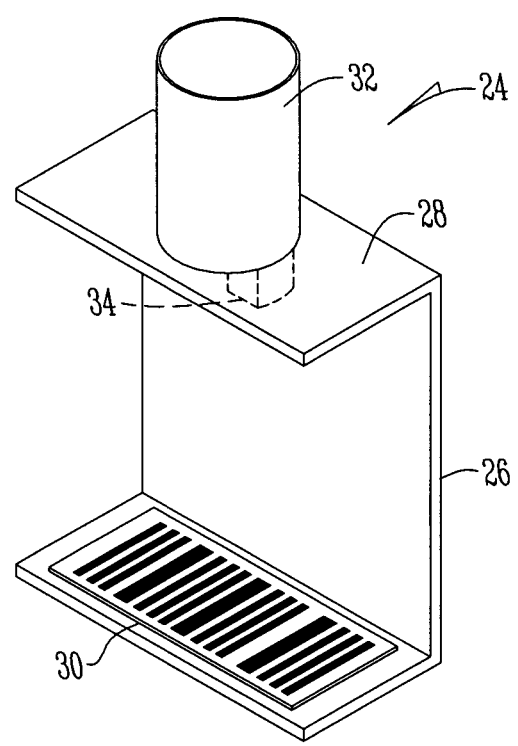
FIG. 2 is a side perspective view of a bracket assembly or a sensor system.

FIG. 1 shows a sensor system 10 for construction equipment 12 such as a road construction vehicle 14 that can be a paver or the like. In one embodiment the road construction vehicle 14 has valving 16 and a drive system 18 that is controlled by a master control 20 that is associated and/or mounted to the vehicle 14. The vehicle in addition has a frame 22 that receives a bracket assembly 24.

Bracket assembly 24 includes a bracket 26 that has a mounting section 28 and a machine readable medium 30 affixed adjacent in spaced relation to the mounting section 28. The machine readable medium 30 in a preferred embodiment is a radio frequency identification (RFID) tag such as an ISO15693 tag. Alternatively, the machine readable medium 30 can be a barcode, barcode matrix, QR code, or the like that has embedded code therein that contains information and/or data in a machine readable format.

A wireless sensor 32 is detachably secured by and held in place by the mounting section 28 of the bracket 26 and has a reading device 34 attached thereto and positioned on the wireless sensor 32 such that the reading device 34 is adjacent the machine readable medium 30 when the wireless sensor 32 is in the mounting section 28 of bracket 26. The wireless sensor 32 can be any typed of wireless sensor including a sonic sensor, laser sensor, or the like. The reading device 34 in a preferred embodiment is a radio frequency identification (RFID) reader that is able to scan and read information from the machine readable medium 30 regarding the location data embedded within the machine readable medium 30. Specifically, the reading device 34 is electrically connected to the master controller 20 in order to send an electronic signal in order to provide the data read from the machine readable medium 30 to the master controller 20.

A plurality of sensors 36 are placed in remote spaced relation from the wireless sensor 32. These sensors provide signals that are received by the wireless sensor 32 and sent to the master controller 20 as indicated in U.S. Ser. No. 13/298,105.

In operation, at the beginning of a work day a road construction worker takes a wireless sensor 32 and places the sensor 32 into the mounting section 28 of the bracket 26. When the wireless sensor 32 is mounted on the mounting bracket 26 the reading device 34 scans and reads the machine readable medium 32 that provides location data to the reading device. The reading device then sends an electronic signal to the master controller providing this location information such that the master controller 20 recognizes the exact fixed location of the wireless sensor 32 being used in association with the vehicle 14 on that particular day. At this time the rest of the plurality of sensors 36 can be placed in their desired location to transmit information to the wireless sensor 32 on the vehicle 14. Once the day is complete the sensors are gathered and the process is repeated the next day.

Thus provided is a sensor system 10 that provides a manner in which a wireless sensor 32 may be identified at a fixed location on a vehicle 14 for processing information. By utilizing the machine readable medium 30 in association with the reading device 34 each wireless sensor does not have to have its own unique wireless receiver, nor does a worker have to individually configure each sensor always installing each sensor in the same machine location. Further, manual configuration switches and/or buttons on the sensor to set up each sensor every time the sensor is moved also is eliminated. Thus, not only is time saved but costs are reduced and thus at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A sensing system for road construction equipment comprising:
   a road construction vehicle;
   a mounting bracket having a machine readable medium affixed thereon;
   a wireless sensor mounted on the mounting bracket and having a reading device; and
   wherein when the wireless sensor is mounted on the mounting bracket the reading device scans the machine readable medium.

2. The sensing system of claim 1 further comprising a plurality of sensors remotely located from and in communication with the wireless sensor.

3. The sensing system of claim 1 further comprising a master controller associated with the road construction vehicle that is electronically connected to the wireless sensor to receive data obtained from the scanning of the machine readable medium.

4. The sensing system of claim 3 wherein the data pertains to the location of the wireless sensor.

5. The sensing system of claim 1 wherein the machine readable medium is a radio frequency identification tag fixed on the bracket.

6. The sensing system of claim 5 wherein the reading device is a radio frequency identification reader.

* * * * *